Aug. 3, 1954  A. ACCOLA  2,685,165
ANCHOR PALLET FOR CLOCKWORKS
Filed Aug. 18, 1953
FIG. 1
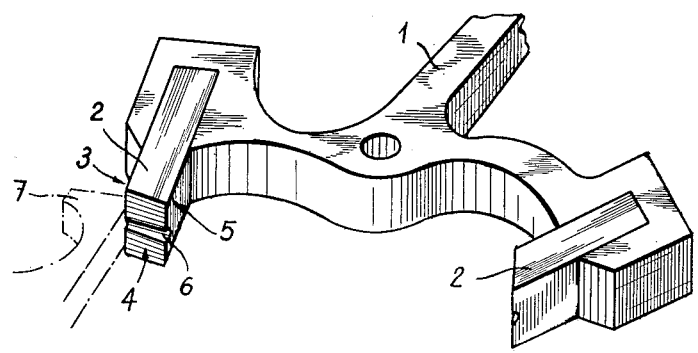
FIG. 2
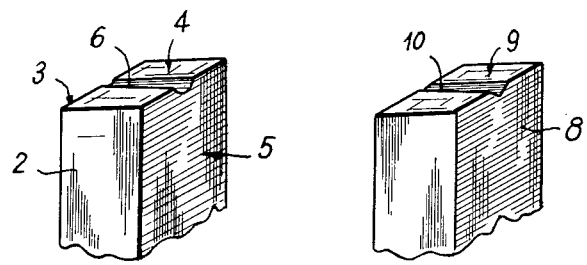
FIG. 3
FIG. 4
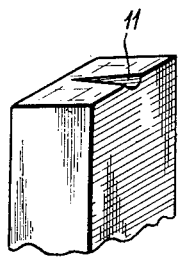

Patented Aug. 3, 1954

2,685,165

UNITED STATES PATENT OFFICE 2,685,165

ANCHOR PALLET FOR CLOCKWORKS

André Accola, La Chaux de Fonds, Switzerland, assignor of one-half to Vesta S A, La Chaux de Fonds, Switzerland, a corporation of Switzerland Application August 18, 1953, Serial No. 374,944

7 Claims. (Cl. 58—121)

The present invention has for its object an anchor pallet for clockworks. This improved pallet is provided with a groove across its impulse plane, said groove starting at the trailing or leaving plane of the pallet.

Accompanying drawing illustrates by way of exemplification a preferred embodiment of the invention together with two modifications thereof. In said drawings:

Fig. 1 is a perspective view of a portion of an anchor with its pallet forming part of a clockwork;

Fig. 2 is a perspective view of a portion of the pallet on said anchor;

Fig. 3 is a perspective view, similar to Fig. 2, of a modification;

Fig. 4 is a similar view of a further modification.

The anchor illustrated is designated by 1 and the pallets thereon by 2. Each pallet has a plane of rest 3, and impulse plane 4 and a trailing plane 5. A groove 6 provided across the impulse plane starts at the trailing plane and extends up to the plane of rest. It forms a capillary channel wherethrough oil may be returned, which oil has previously been carried along by the teeth 7 of the escape wheel from the plane of rest towards the trailing plane. Between the successive passages of a tooth 7, the oil brought onto the trailing plane returns through capillarity towards the plane of rest 3. To this end, the depth of the groove and also its breadth vary gradually, the narrowest and shallowest portion of the groove being located at its end opening into the plane of rest 5.

In the embodiment illustrated in Figs. 1 and 2, the cross-section of the groove assumes the shape of a semi-circle. In Fig. 3 is illustrated a pallet 8 in the impulse plane 9 of which is formed a groove 10 the cross-section of which assumes the shape of a V.

In the further modification of Fig. 4, the groove 11 stops short of the plane of rest, but it plays, however, the same part as the grooves illustrated in the preceding embodiments.

What I claim is:

1. In combination with a clockwork anchor, the provision of a pallet provided with a groove extending over the impulse plane thereof and starting from the trailing surface of said pallet in the direction of the plane of rest engageable by the escape wheel teeth.

2. In combination with a clockwork anchor, the provision of a pallet provided with a groove extending over the impulse plane thereof and starting from the trailing surface of said pallet in the direction of the plane of rest of the pallet to open into the last mentioned plane.

3. In combination with a clockwork anchor, the provision of a pallet provided with a groove extending over the impulse plane thereof and starting from the trailing surface of said pallet in the direction of the plane of rest engageable by the escape wheel teeth, the depth of said groove decreasing gradually starting from the trailing plane.

4. In combination with a clockwork anchor, the provision of a pallet provided with a groove extending over the impulse plane thereof and starting from the trailing surface of said pallet in the direction of the plane of rest engageable by the escape wheel teeth, the breadth of said groove decreasing gradually starting from the trailing plane.

5. In combination with a clockwork anchor, the provision of a pallet provided with a groove having a V-shaped cross-section, extending over the impulse plane thereof and starting from the trailing surface of said pallet in the direction of the plane of rest engageable by the escape wheel teeth.

6. In combination with a clockwork anchor, the provision of a pallet provided with a groove having a semi-circular cross-section, extending over the impulse plane thereof and starting from the trailing surface of said pallet in the direction of the plane of rest engageable by the escape wheel teeth.

7. In combination with a clockwork anchor, the provision of a pallet provided with a groove extending over the impulse plane thereof and starting from the trailing surface of said pallet, the depth of said groove decreasing gradually starting from said trailing surface up to a point slightly short of the plane of rest of the pallet.

References Cited in the file of this patent

FOREIGN PATENTS

| Number | Country | Date |
|---|---|---|
| 116,857 | Switzerland | Oct. 1, 1926 |
| 215,704 | Switzerland | Jan. 5, 1942 |